US005149230A

United States Patent [19]

Nett

[11] Patent Number: 5,149,230

[45] Date of Patent: Sep. 22, 1992

[54] ROTATING DUAL ATTACHMENT RECEPTACLE APPARATUS TOOL

[76] Inventor: Daniel R. Nett, 2401 Commor, Hamtramck, Mich. 48212

[21] Appl. No.: 662,719

[22] Filed: Mar. 4, 1991

[51] Int. Cl.[5] .............................................. B23B 45/02

[52] U.S. Cl. .......................................... 408/42; 7/165; 81/57.31; 81/57.32; 81/57.5; 408/125; 408/234

[58] Field of Search .................. 279/14; 408/124, 125, 408/234, 20, 35-37, 42, 236, 241 R; 7/138, 142, 158, 165; 81/57.14, 57.22, 57.31, 57.32, 57.5; 173/50

[56] References Cited

U.S. PATENT DOCUMENTS 1,816,812 8/1931 Allison .
3,783,955 1/1974 Gill ................................ 81/57.22 X
3,965,510 6/1976 Ernst ................................ 7/14.1 R
4,512,693 4/1985 Swanson ......................... 408/239 R
4,653,356 3/1987 Golden .............................. 81/57.14
4,810,916 3/1989 McBride .............................. 310/50
4,932,294 6/1990 Chang .................................. 81/490
4,945,790 8/1990 Golden .............................. 81/57.14
4,962,681 10/1990 Yang ...................................... 81/54

*Primary Examiner*—Steven C. Bishop
*Attorney, Agent, or Firm*—Joseph J. Goluban

[57] ABSTRACT

A rotating dual attachment receptacle apparatus tool which allows the operator to use more than one tool accessory without the need of frequent changing of the drilling, driving or fastening accessory. The rotating apparatus tool has three (3) major parts: a stem grip housing having a motor and power means disposed therein; a safety guard housing attached to one end of the stem grip housing and a rotating drill head assembly disposed within the safety guard housing. The rotating drill head assembly has two (2) conventional drill chucks located at opposite ends thereof and is held in place within the cavity of the safety guard housing by means of a main drive shaft which extends from the top inside portion of the safety guard housing into the stem grip housing. The rotating drill head assembly is so constructed that it can be rotated in a 360 degree plane about the longitudinal axis of the main drive shaft. Said rotating drill head assembly can be locked or unlocked by locking means consisting of two (2) release buttons located on its sides. The locking mechanism for saafety reasons is so constructed that unless both release buttons are pressed simultaneously it will not unlock the drill head. When the drill head assembly is rotated it will disengage the power means to prevent accidental operation of the rotating apparatus tool chucks.

38 Claims, 3 Drawing Sheets

FIG-2
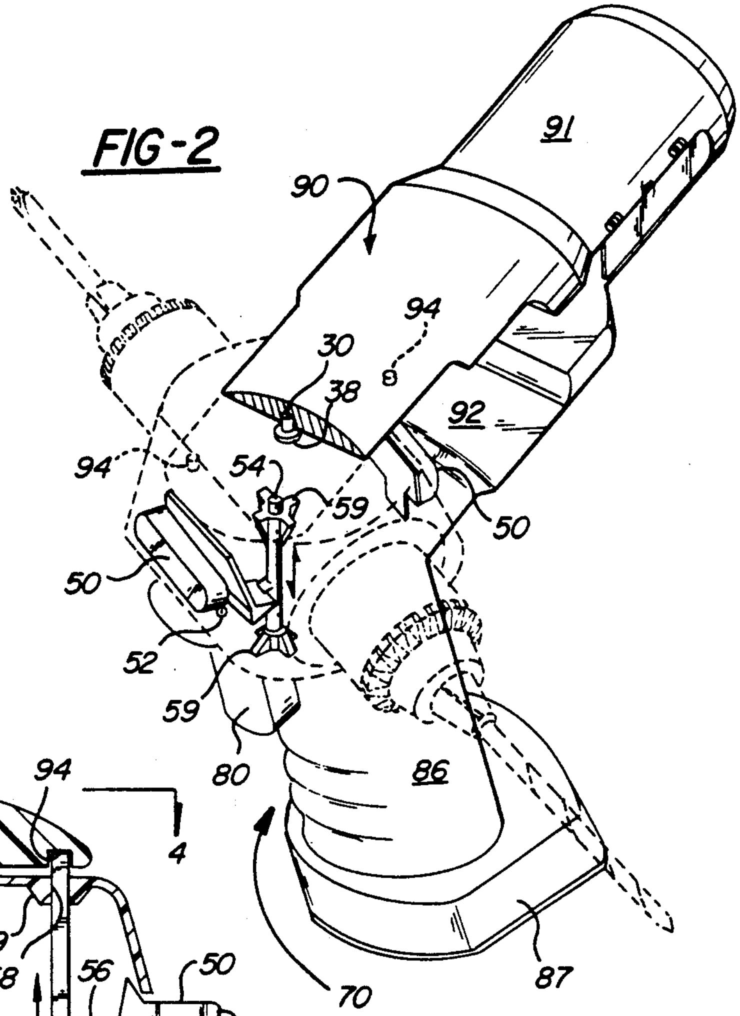
FIG-3
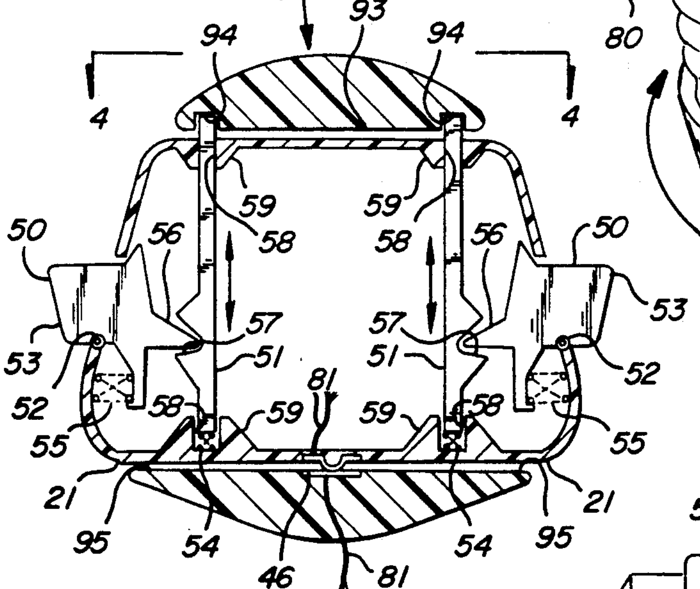
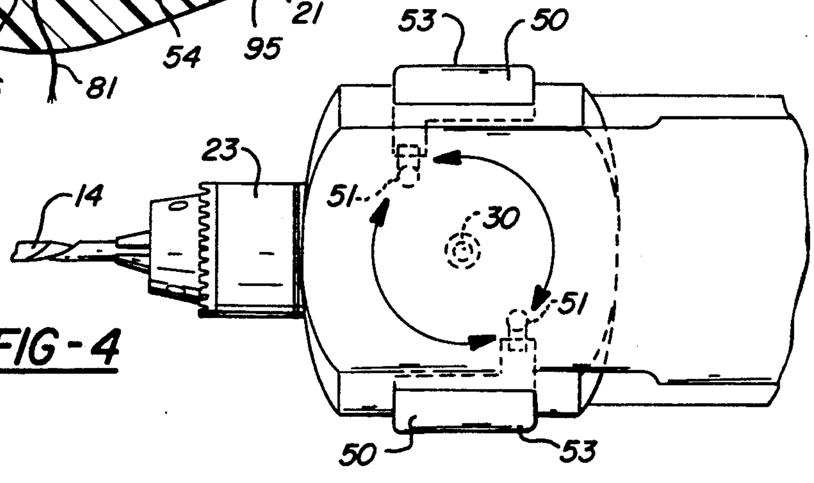
FIG-4

ROTATING DUAL ATTACHMENT RECEPTACLE APPARATUS TOOL

BACKGROUND OF THE INVENTION

1. Field of the Invention

The invention relates to a rotating dual attachment receptacle apparatus tool which allows the user to utilize more than one accessory on a hand held power tool, without the need of changing the drilling or fastening accessory. My invention saves time, eliminates the inconvenience of multiple chucking and unchucking operations, and provides a safe lightweight drilling/driving tool that is economic to manufacture and easy to use.

The task of changing drill bits or other drilling/driving/or fastening accessories has always been a problem, especially when time, convenience and safety are considered. It is not uncommon on any given project to use many different accessories before the completion of the project which require a special tool, such as a chuck key or hex wrench each time an accessory is changed. This frequent switching of accessories causes a loss in time, lessen efficiency and can contribute to reduced safety conditions due to the resultant operator fatigue.

My invention has two separate receptacles, hereafter referred to as a chuck for attachment of accessories, which are located on a rotating drill head assembly. The drill head assembly is so constructed that once the two (2) different accessories are installed into the chuck the switching of accessories can be done quickly and easily, by simply rotating of the rotating drill head assembly until the second chuck with accessory is placed in the operational mode. The rotating drill head assembly is designed for safety reasons to require the operator to simultaneously depress the two (2) locking release buttons before the rotating drill head assembly can rotate about its longitudinal axis of the apparatus main drive shaft. Again for safety reasons a plurality of electric contacts have been disposed within the rotating dual attachment receptacle apparatus tool so as to immediately open the electric circuit once the rotatign drill head assembly is unlocked and rotated about the main drive shaft axis.

Thus, the time and effort required to perform a series of similar drill and drive operations, such as, drilling a hole into a wall or ceiling and then driving a screw or similar fixture into the drilled hole can be dramatically reduced, since switching between the drilling and driving accessories can be done quickly and easily by simply rotating the rotating drill head assembly.

2. Description of Prior Art

A variety of hand held electric tools are currently available, such as, conventional electric drills, electric screw drivers, electric socket wrenches and the like, and such tools tend to be relatively expensive, therefore the elimination of multiple tools where practical produces economic benefit in both material and labor savings.

A few hand tools have been developed with multiple tool heads permanently attached to the fingers of a turret which is rotatable to allow each tool head to travel to a work position. An example of such a structure is illustrated in the Cummingham patent U.S. Pat. No. 910,789. However the Cummingham patent tool is not practical for general assembly work or repair work.

In order to eliminate the use of two separate power driven tools or the constant chucking and unchucking of separate tools into one electric drill, various tool holding attachments for electric drills have been suggested, one such device is the Swanson patent U.S. Pat. No. 4,512,693. The Swanson patent relates to a reversible drill and drive tool holder for use in performing a series of similar drill and drive operations. The Swanson patent as a reversible drill and drill tool holder and attachment to a drilling tool lacks the ability to work in close quarters, requires the exertion of a positive pressure to engage the accessory and fails to provide any protection of the user by having externally exposed surface and openings that can easily catch onto surrounding materials. The Swanson patented drive tool holder does not solve the prior art problem as the applicants invention has.

Another form of rotary power tool with a dual head accessory is evidenced by U.S. Pat. No. 4,810,916 McBride. The McBride patent design is flawed in that it only allows for convenient and accurate power control when using only one of the two chucks. It has a dangerous operating characteristic in that the trigger handle configuration is such, that a user operating said device while using the covered chuck within the retractable guard could unavoidably cause one to activate the power at full speed due to the horizontal pushing required during the drilling operation. Further the McBride patent does not protect the user from the uncovered chuck when the chuck having the retractable guard is being used, leaving the user at risk of being injured by the point of the exposed accessory during its operation.

Finally the access to the chuck having the safety guard is at least difficult, if not impossible, since the space between the chuck and retractable guard is too small to allow for the use of a chuck key due to the spring intrusion. The McBride patent fails to utilize the solutions suggested by applicant's invention, thus lacks the improved functioning charactristics associated with a dual headed accessory which uses a rotating drill head assembly.

SUMMARY OF THE INVENTION

In accordance with the present invention, I have invented a new and improved rotating dual attachment receptacle apparatus tool which eliminates one or more of the prior art problems associated with such appartus.

Another object of the present invention is to provide a rotating dual attachment receptacle apparatus tool which eliminates the need for frequent changing of drilling, driving or fastening accessory.

Another object of the present invention is to provide and improved apparatus having a rotating drill head assembly which has a dual chuck.

Another object of the present invention is to provide an improved apparatus which can be safely and easily held by a workman, during the operation of said apparatus dual chuck accessory.

Still another object of the present invention is to provide an improved apparatus that utilizes two (2) pinions which allows for the use of low or high RPM power.

Still another object of the present invention is to provide an improved apparatus which can utilize either AC or DC electric power source.

Still another object of the present invention is to provide an improved apparatus which can utilize a pneumatic power source.

A further object of the present invention is to provide an improved apparatus which utilizes a power trigger drill head assembly that provides a safe, accurate and comfortable power control.

A further object of the present invention is to provide an improved apparatus which utilizes conventional drill chuck, keyless chucks, or various attachable receptacles designed for other types of drilling, driving, fastening and unfastenting tasks.

A further object of the present invention is to provide an improved apparatus which utilizes a main draft shaft that function both as a drive shaft and a pivoting axis (hinge) for the rotating drill head assembly.

A still further object of the present invention is to provide an improved apparatus which utilizes a safety guard housing wherein one (1) of the two (2) chuck resides while the other chuck with accessory is being put into service.

A still further object of the present invention is to provide an improved apparatus which has a plurality of electric contacts which open and close the apparatus electric circuit.

A still further object of the present invention is to provide an improved apparatus which has locking means to lock and unlock the rotating drill head assembly.

A still further object of the present invention is to provide an improved apparatus which can control the chuck direction of rotation.

Further objects and advantages of this invention will be apparent from the following description and appended claims, reference being made to the accompanying drawings forming a part of this specification, wherein like reference characters designate corresponding parts in the several views.

BRIEF DESCRIPTION OF THE DRAWINGS

The foregoing and other objects, features and advantages of the invention will be apparent from the following more particular description of a preferred embodiment of the invention, as illustrated in the accompanying drawings, in which:

FIG. 2 is a partially fragmented perspective view of my rotating-tool with the rotating drill head assembly shown in phantom being rotated in a counter-clockwise direction and showing the preferred locking mechanism displacement.

FIG. 3 is cross-sectional view taken along line 3—3 of FIG. 1 showing an elevation view of the preferred locking mechanism used to lock and unlock the rotating drill head assembly.

FIG. 4 is partial top view taken along lines 4—4 of FIG. 3 showing a plan view of the preferred locking mechanism.

It is to be understood that the present invention is not limited in its application to be details of construction and arrangement of parts illustrated in the accompanying drawings, since the invention is capable of other embodiments and of being practiced or carried out in various ways within the scope of the claims. Also, it is to be understood that the phraseology and terminology employed herein is for the purpose of description and not of limitation.

DETAILED DESCRIPTION OF THE PREFERRED EMBODIMENT OF THE INVENTION

Figure 1:
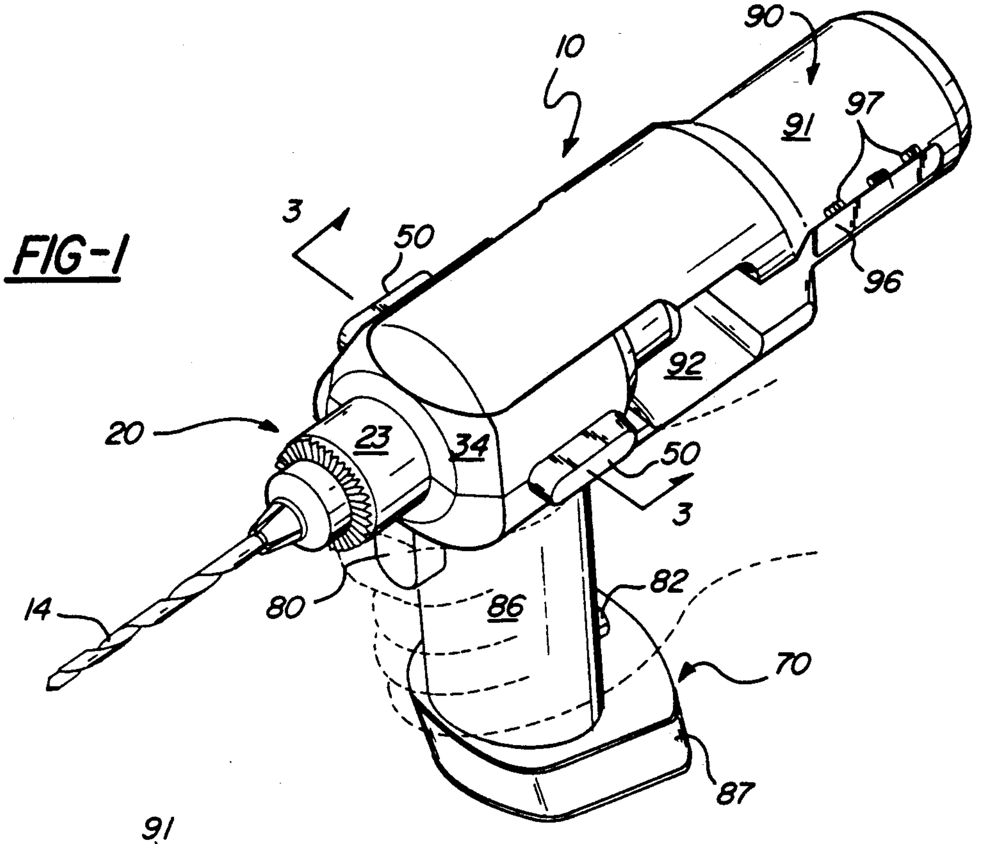
FIG. 1 is a perspective view of the preferred embodiment of my rotating dual attachment receptacle apparatus (rotating-tool), showing an operators hand in phantom.

Referring now to FIG. 1 of the drawings my Rotating Dual Attachment Receptacle Apparatus Tool 10 preferred embodiment is shown in a perspective view as would be held by an operator. The rotating apparatus tool 10 has a rotating drill head assembly 20, safety guard housing 90, and stem grip housing 70.

The rotating drill head assembly 20, has two (2) conventional chucks 22 and 23 located at its opposite ends. The rotating drill head assembly 20 is held in place within the cavity 92 of the safety guard housing 90 by means of a main drive shaft 30 which extends from the top inside portion 93 of the safety guard housing 90 into the stem grip housing 70, as can be seen in FIGS. 2, 5, and 7 of the drawings.

Figure 5:
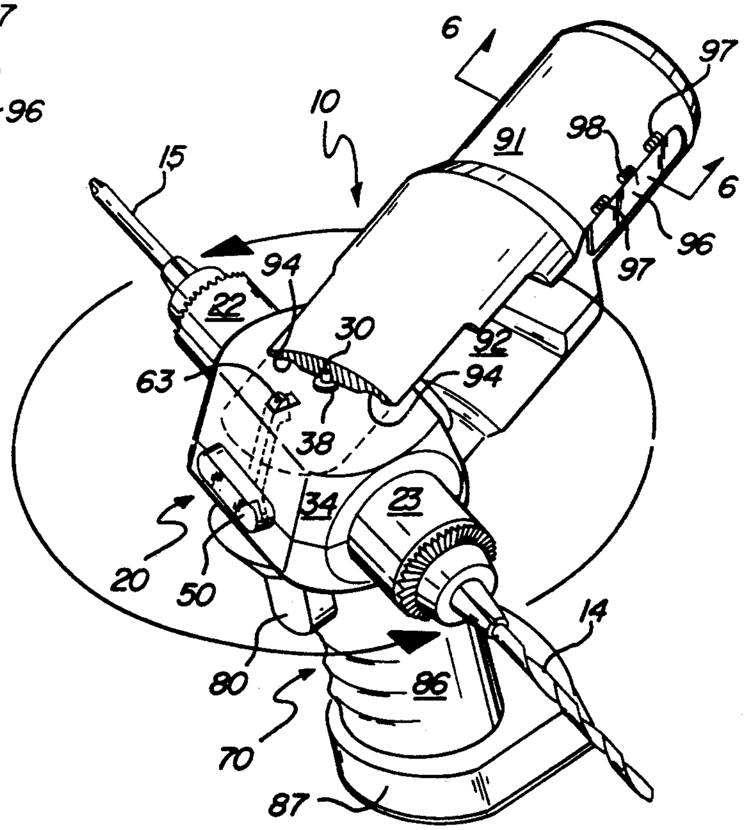
FIG. 5 is a partially fragmented perspective view of my rotating-tool showing the rotating drill head assembly being rotated in a counter-clockwise direction with another verison of a locking mechanism.

The rotating drill head assembly 20 is so constructed that it can be rotated in a 360 degree plane about the longitudinal axis of the main drive shaft 30, as can be seen in FIG. 5 of the drawings.

Figures 7, 8, 9:
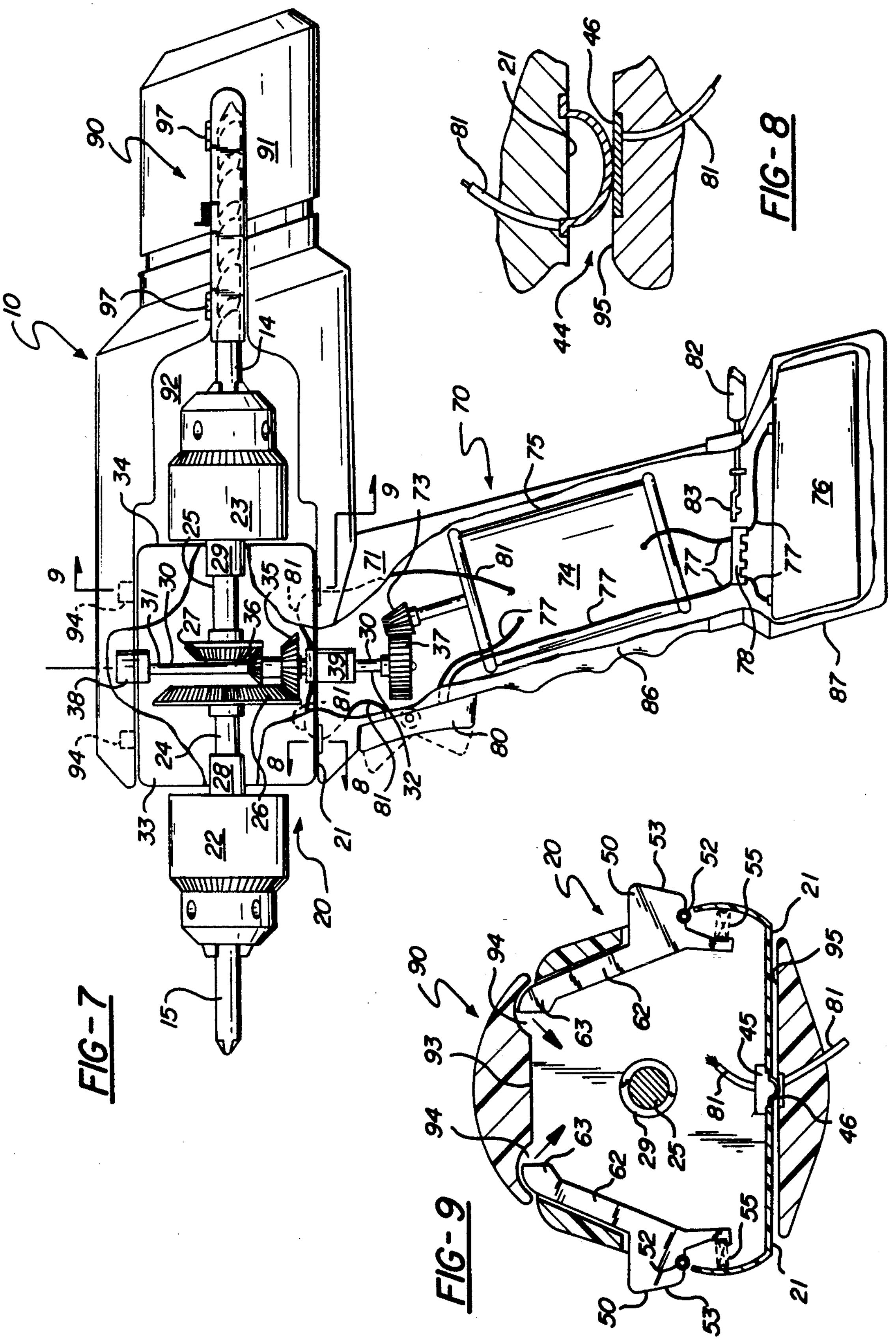
FIG. 7 is a partially fragmented side elevational view of my rotating-tool showing the electric motor, power source and internal mechanism of the rotating drill head assembly.
FIG. 8 is a partial sectional view along lines 8—8 of FIG. 7 showing an enlarged view of the electrical power contacts.
FIG. 9 is a cross-sectional view taken along line 9—9 of FIG. 7 showing another version of the locking mechanism.

Referring now to FIG. 7 of the drawings which is a partial fragmented side elevational view of my rotating dual attachment receptacle apparatus tool 10 where a detailed inside view of both the rotating drill head assembly 20 and stem grip housing 70 is shown. The internal mechanism of the rotating drill head assembly 20 disposed within safety guard housing 90, cavity 92 is shown as having a main drive shaft 30 and a plurality of chuck shafts 24 and 25 located therein. The main drive shaft 30 has an upper 31 and lower end 32, wherein the lower end 32 extends into the stem grip housing 70 and the upper end 31 extends into the safety guard housing 90. While the chuck shafts 24 and 25 extends through the front 33 and back ends 34 of the rotating drill head assembly 20, with the longitudinal axis of the chuck shaft 24 and 25 being normal to the longitudinal axis of the main drive shaft 30 and having a chuck 22 and 23 attached to each respective end thereof. The chuck shaft 24 and 25 journal (not shown) are suitably disposed within bearing 28 and 29 respectively.

In this preferred embodiment of my invention I have disclosed the use of two different gears 26 and 27 ratio for each chuck 22 and 23, one high speed/low torque output and one low speed/high torque output. The use of two (2) gear ratios would provide a high amount of versatility, as well as the ideal configuration for the drilling and driving of screws (not shown) respectively.

While I have disclosed the use of a large gear 26 which is suitably attached to chuck shaft 24 and small gear 27 which is suitably attached to chuck shaft 25, I want to make it clear that it is possible to use gears of the same ratio.

The rotation of the large gear 26 and small gear 27 is achieved by the mechanical power provided by the large pinion gear 35 and small pinion gear 36 respectively. The large pinion gear 35 and small pinion gear 36 are conversely suitably affixed to main drive shaft 30 which in turn is driven by regular gear 37.

It can be appreciated that the main drive shaft 30 actually performs two functions, viz: the transmitting of the mechanical power to the respective chuck gears 26 and 27 and serves as the pivoting axis for the drill head assembly 20. The main drive shaft 30 is so designed to allow the drill head assembly 20 to rotate about its longitudinal axis in a 360 degree plane. The journal (not shown) of the main drive shaft 30 is disposed through a plurality of bearing 38 and 39.

The upper bearing 38 is located within the top inside surfaces 93 of the safety guard housing 90 and the lower bearing 39 is disposed within the stem grip housing 70 and cooperatively accepts the journal of the main drive shaft 30.

It can be further appreciated that the mechanical components of my invention are assembled with the appropriate sealed bearings 28, 29, 38 and 39, in such a way, that none of the moving parts slide against each other in a way that might produce friction or rapid wear. These bearings are the type where no additional lubrication is required to maintain their proper performance.

Referring now to FIG. 8 of the drawings which show the electric contact 44 in a closed position. The electric contacts 44 are suitably located at the lower front portion 95 of safety guard housing 90 and the bottom end 21 of rotating drill head assembly 20, wherein the electric contacts 44 close the electrical circuit when said rotating drill head assembly 20 is positioned in either of the 180 degree locking intervals.

The electric contacts 44 are so designed as to provide a closed circuit by means of a convex contact arc 45 and flat contact pad 46 when the rotating drill head assembly 20 is located in either of its two (2) locking interval positions. It can be appreciated, that should the contact between the convex contact are 45 and flat contact pad 46 be broken, the electric current flowing through the power trigger 80 and electrical ground wire 81 located within stem grip housing 70 would be opened. A plurality of electric contacts 44 have been disposed within the rotating dual attachment receptacle apparatus tool 10 so as to immediately open the electric circuit once the rotating drill head assembly 20 is unlocked and rotated about the main drive shaft axis 30 for safety reasons.

Further, the rotating drill head assembly 20 is also designed to require the operator to simultaneously depress the two (2) lock release buttons 50 to deactivate the locking means before the rotating drill head assembly 20 can be rotated about its longitudinal axis of the apparatus main drive shaft 30.

Referring to FIGS. 2, 3 and 4 of the drawings, my preferred embodiment of a locking means is shown within said drill head assembly 20 and extends into the locking depression 94 located within said safety guard housing 90, said preferred locking means has a sliding post 51 portion which extends into the locking depressions 94 and securely holds the rotating drill head assembly 20 at either of the 180 degree interval locking positions.

The rotating drill head assembly 20 can be locked or unlocked by simultaneous depression of the two (2) release buttons 50 located on its sides. The release buttons 50 work in cooperation with a sliding post 51 extension that projects into a plurality of locking depressions 94 positioned diagonally from the longitudinal axis of the main drive 30 shaft at an equal distance therefrom. The release buttons 50 are pivotly affixed to the rotating drill head assembly 20 by means of hinges 52. Upon the application of an external force on the external portion 53 of the lock release button 50, the sliding post 51 will be urged to move in a downward vertical direction forcing the compression of both the post springs 54 and button springs 55.

Referring to FIG. 3, it can be seen that the lock release button 50 has a triangular shaped tab 56 which fits into the notch 57 formed by two similar tabs that extend off of the sliding post 51. The upper portion of sliding posts 51 extends through the top of the drill head assembly 20 into the locking depression 94 located in the top inside surface 93 of safety guard housing 90 to lock the drill head assembly 20 securely into place. When the lock release button 50 is depressed, its tab 56 pushes the sliding post 51 downward, until it is no longer seated in the locking depression 94 of safety guard housing 90. The configuration described above occurs two (2) times, once on each side of the rotating drill head assembly 20. While the lower portion of the sliding post 51 resides within the aperture 58 of the anchor 59 located at the bottom inside surface of rotating drill head assembly 20.

It is important that the sliding posts 51 are both positioned diagonally of the center line, and are equally spaced from the center of the main drive shaft 30 axis, and if a line were drawn between them, it would pass through that center of said device. This configuration assures, that for safety reasons, the drill head assembly 20 will not rotate unless both release buttons 50 are pressed simultaneously. It also assures that rotating drill head assembly 20 will be securely locked at only the 180 degrees intervals. I should further note that this type of lock/release system can work effectively without interfering with other components of the assembly.

It can be appreciated that once the external force is removed from the locking release buttons 50 that the sliding post 51 will move in a vertical direction returning to its original station due to the urging of compressed post springs 54 and button springs 55.

A second embodiment of a means for locking the rotating drill head assembly 20 can be seen by referring to FIGS. 5 and 9 of the drawings. As can be seen by referring to the drawings the hinges 52, button springs 55 and the external portion 53 of the locking releasing button 50 have not changed. However, the tab 56 of the lock release button 50 has been replaced with a stem extension 62 having a stem end 63 which is disposed within the locking depressions 94 of the safety guard housing 90. Upon the application of an external force on the external portion 53 of the lock release button 50, the stem end 63 of the stem extension 62 will move in a arc path away from the locking depressions 94 forcing the compression of button springs 55. Once the external force is removed from the locking release buttons 50 the compressed button springs 55 will cause the return of stem end 63 to its original station. It can be appreciated that this second embodiment of the rotating drill head assembly 20 does not require the use of a sliding posts 51, post springs 54 and anchor 59, therefore providing a simpler and more economincal version thereof.

Referring to FIG. 7 of the drawings it can be seen that the rotating drill head assembly 20 in its operational mode almost completely encloses drill bit 14 accessory 13 of chuck 23 within the cavity 92 of safety guard housing 90. Further the saftey guard housing 90 is located at one end of said stem grip housing 70 and is disposed generally normal to the longitudinal axis of said stem grip housing, and suitably affixed thereto. The safety guard housing 90 has a plurality of locking depressions 94 within the top inside surface 93 thereof and cooperatively accepts either of the above disclosed locking means.

Figure 6:
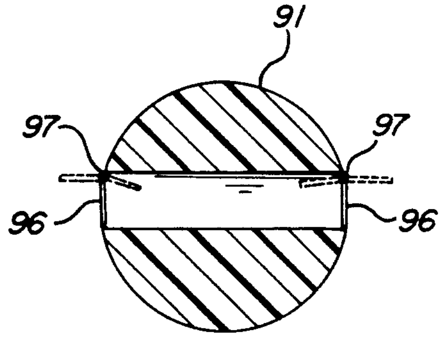
FIG. 6 is a cross-sectional view taken along lines 6—6 of FIG. 5 showing the safety door operation in phantom.

Referring now to FIG. 5 of the drawings, the rotating drill head assembly 20 is shown as being rotated in counter-clockwise direction as depicted by arc arrows, in a plane perpendicular to the main drive shaft 30 without the need of rechucking either tool accessory drill bit 14 or phillips driver 15. As an added safety feature to protect the user from injury while working in close quarters from having the externally exposed surface and openings of the non-used end of the accessory tool from catching onto surrounding materials, a safety door 96 has been added to the accessory end 91 of safety guard housing 90. Referring to FIG. 6 of the drawings which is a cross-sectional view of the accessory end 91 of the safety housing 90, the safety door 96 displacement is shown by phantom lines. Being that the rotating drill head assembly 20 can rotate in either a clockwise or counter-clockwise direction, the safety doors 96 are operatively mounted to the safety housing guard 90 by hinge 97 to allow its opening in either direction. Once the drill bit 14, or phillips driver 15 accessory clears the safety door 96 the safety door 96 returns to its closed position due to the combination effect of the hinge 97 and torsional/helical type hinge spring 98 (not shown).

Thus it can be appreciated that the safety door 96, protects the user from accidental contact with the accessory disposed within the non-operational chuck and that hinge spring 98 maintains safety door 96, in a closed position except when enough pressure is exerted by either accessory against safety door 96, when the drill head assembly 20, is being rotated about main drive shaft 30.

Referring to FIG. 7 of the drawings which is a partially fragmented side-elevational view of my invention shows the rotating drill head assembly 20 disposed within the safety guard housing 90, and cavity 92, with the safety guard housing 90 being suitably affixed to the top end 71 of the stem grip housing 70.

In this preferred embodiment of the invention the stem grip housing 70 is shown as having an electric motor 74 and power source 75 disposed therein. While I have shown the use of a reversible, variable speed electric motor 74 that receives its power from a rechargeable battery 76, this does not limit the possibility of using other power means such as standard A.C. or pneumatic power source 75, nor other types of power control. The rechargeable battery 76 is suitably connected by electric wires 77 to the electric rheostat 78 and power trigger 80 and can be easily replaced via removable base 87 of stem grip housing 70 should it be required.

While I have disclosed the use of a rheostat 78 to regulate the peak speed of the motor which is well known in the electric art, the use of any other type of electric apparatus, such as a shunting resistor when using motors of adjustable speed or variable speed could also be used. Further, the direction of rotation of the electric motor 74 can be easily changed by any of the well known electric procedures, viz. reversial of the polarity of the armature and series field as a unit (compound-motor) connecting the capacitor across the other windings (capacitor motor), shifting the brushes from one side of the electric neutral to the other by shifting the line of the short-circuited brushes 90 degrees (single-phase repulsion-induction motor) or the interchanging of any of the two of the three electric heads (induction motor), none of the above is shown in the drawings.

It therefore can be appreciated that the peak speed adjuster 82 with its detented lever 83 can be used to regulate the speed of the electric motor 74 by varying the electrical resistance of the rheostat 78.

The rotating dual attachment receptacle apparatus tool 10 can be activated by the closing of the electric circuit when the power trigger 80 is moved as indicated by the phantom lines in FIG. 7 of the drawings. Unlike some prior art apparatus to operate my invention one only needs to squeeze the power trigger 80 while holding the grip 86 portion of stem grip housing 70. It is not necessary to engage any other locking or clutching mechanisms by the exertion of pressure to activate my device. This makes my invention useful for very delicate operations where very subtle or no force at all is required to complete the task.

Further it is important to note that the power trigger 80 remains in the same ideal location in relationship to the active (non-stored) tool accessory thus providing for consistently comfortable and accurate power control without the dangers associated with the prior art problem of the user being injured by the exposed accessory or unavoidable activation of the tool at full speed. Once the power trigger 80 closes the electric circuit the current (either ac or dc) is allowed to flow from the power source 75 through electric wires 77 into rheostat 78 past the power trigger 80, into the electric ground wire 81 through convex contact arcs 45 and flat contact pads 46 to complete the circuit back to the electric motor 74 and back through the rheostat 78 to the power source 75. However, as above described in detail, should the electric circuit be opened between convex contact arcs 45 and flat contact pad 46 when the rotating drill head assembly 20 is rotated, neither tool accessory will be activated even if the power trigger 80 is accidentally depressed, thus eliminating the possibility of the user being injured accidentally by a pointed accessory during the rotation of the rotating drill head assembly 20.

Once the electric power source 75 is activated the electric motor 74 will cause the drive gear 73 to rotate and turn regular gear 37 affixed to the main drive shaft 30, which in turn will activate chuck shafts 24 and 25 simultaneously. However, should the rotating drill head assembly 20 be rotated from its locked position the electrical contacts 44 would be opened and the invention would not operate for obvious safety reasons.

Therefore the rotating dual attachment receptacle apparatus tool 10 may be operated in any of the locking positions, when either chuck 22 and 23 are being used, which allows for an easy changing to a second drilling, driving or fastening accessory by simply rotating the drill head assembly 20 in a plane perpendicular to the main drive shaft 30 to utilize either accessory without the need for rechucking it.

Applicant has explained in detail how the invention is made in the above detailed description of the preferred embodiment, and would now like to explain how to use said invention. The user would hold the rotating dual attachment receptacle apparatus tool 10, as he/she would hold any conventional drill, by means of the stem grip housing 70 with either hand. The electrical power to the exposed tool accessory is activated by the users index and middle finger by slowly squeezing the power trigger 80, as can be best seen by referring to FIG. 1 of the drawings. The squeezing of the power trigger 80 will cause the electric circuit to close and activate the tool accessory. Variable speed is obtained by the extent of which power trigger 80 is depressed. The farther it is depressed, the faster the speed of motor. The peak speed adjuster 82 only serves the purpose of setting/limiting the highest speed possible when power trigger 80 is fully depressed. Power trigger 80 has it own rheostat in addition to the rheostate of the peak speed adjuster 82. The peak speed of the accessory rotation can be attained by means of the peak speed adjuster 82 which is suitably contacted to rheostate 78.

In the disclosure of the preferred embodiment of the invention the use of two (2) different pinion gears 35 and 36 was disclosed as producing a low speed/high torque and high speed/low torque rotation respectively. As seen in FIG. 7 the large pinion gear 35 is shown in combination with a chuck 22 which has phillips driver 15 tool accessory attachment where a lower speed/high torque operational characteristic is desirable when driving a screw. While the small pinion gear 36 is shown in combination with a chuck 23 which has a drill bit 14 tool accessory attachment, where a high speed/low torque operational characteristic is required. To switch from the operation of chuck 22 to chuck 23 with any accessory tool 13, simply press both lock release buttons 50 simultaneously to deactivate the apparatus rotating drill head assembly 20 locking mechanism. Once the lock release buttons 50 are pressed the sliding post 51 or stem end 63 is withdrawn from the lock depression 94 disposed within the top inside portion 93 of the safety guard housing 90. The rotating drill head assembly 20 may then be rotated 180 degrees until the sliding post 51 or stem end 63 is urged back into the lock depression 94.

It can be appreciated as the rotating drill head assembly 20 is rotated that the electric contact 44 is opened which eliminates the accidental activation of both tool accessories. Should the user desire to change either accessory it is easily done as with any conventional drill, by using either a key type or keyless chuck device standard in the art. My invention can utilize conventional type drill chucks, or the newer type keyless chuck, as well as attachment receptacles designed for other types of drilling, driving, fastening and unfastening tasks.

Thus by abandoning the previous construction of power tools the time required to perform a series of similar drill and drive operations, such as drilling a hole into a wall or ceiling and then driving a screw or similar fixture into the drilled hole is dramatically reduced. Since switching between the drilling and driving accessories can be done quickly and easily by simply rotating drill head assembly 20. Further by chucking two (2) different size drill bits into chucks 22 and 23 drilling holes of two (2) different diameters without the hassle of rechucking a conventional drill is also useful. The need to drill two (2) different diameter holes is a common practice in the construction industry as well as the home shop. Drilling and driving is merely one of several common conveniences this drill provides or makes easier.

In accordance with the present invention, I have invented a new and improved rotating dual attachment receptacle apparatus tool 10 which eliminates one or more of the prior art problems associated with such apparatus, by use of a rotating dual attachment receptacle apparatus tool 10 which eliminates the need for frequent changing of drilling, driving or fastening accessories.

I claim:

1. A Rotating Dual Attachment Receptacle Apparatus Tool comprising:

a stem grip housing having a top and bottom end, said stem grip housing having an electric motor disposed therein;

a safety guard housing, said safety guard housing being disposed generally normal to the longitudinal axis of said stem grip housing and suitably affixed thereto; said safety guard housing having disposed therein a cavity;

a rotating drill head assembly having a top and bottom end, said rotating drill head assembly being generally disposed within said safety guard housing cavity having a main drive shaft and a plurality of chuck shafts therein, the main drive shaft having an upper and lower end, wherein the lower end extends into said stem grip housing and the upper end extends into said safety guard housing; said rotating drill head assembly being able to rotate about the main drive shaft axis;

a locking means disposed within said rotating drill head assembly which extends into locking depressions located within the top inside surface of said safety guard housing; the locking means has a sliding post portion which extends into the locking depressions and securely locks said rotating drill head assembly at 180 degree interval locking positions;

a means for opening and closing the motor's electric circuit, the opening and closing means comprises a plurality of electric contacts suitably located at the lower front portion of said safety guard housing and the bottom end of said rotating drill head assembly, wherein the electric contacts close the electrical circuit when said rotating drill head assembly is positioned in either of the 180 degree locking interval positions;

whereby said rotating drill head assembly can be rotated in a plane perpendicular to the main drive shaft to utilize either accessory without the need of rechucking it.

2. A rotating dual attachment apparatus tool as defined in claim 1, wherein said device has two (2) different gear ratios, one high speed/low torque and one (1) low speed/high torque.

3. A rotating dual attachment apparatus tool, as defined in claim 2, wherein said device has a safety door covering part of said safety guard housing cavity.

4. A rotating dual attachment apparatus tool, as defined in claim 3, wherein said device's electric motor speed and direction of rotation is controllable by a speed adjuster located on said stem grip housing.

5. A rotating dual attachment apparatus tool comprising:

a stem grip housing having a top and bottom end, said stem grip housing having an electric motor disposed therein;

a safety guard housing, said safety guard housing being disposed generally normal to the longitudinal axis of said stem grip housing and suitably affixed thereto; said safety guard housing having disposed therein a cavity;

a rotating drill head assembly having a top and bottom end, said rotating drill head assembly being generally disposed within said safety guard housing cavity having a main drive shaft and a plurality of chuck shafts therein, the main drive shaft having an upper and lower end, wherein the lower end extends into said stem grip housing and the upper end extends into said safety guard housing; said rotating drill head assembly being able to rotate about the main drive shaft axis;

means for locking said rotating drill head assembly, the locking means being disposed within said rotating drill head assembly;

means for opening and closing the motor's electric circuit, the opening and closing means comprises a plurality of electric contacts suitably located at the lower front portion of said safety guard housing and the bottom end of said rotating drill head assembly, wherein the electric contacts close the electrical circuit when said rotating drill head assembly is positioned in either of the 180 degree locking interval positions;

whereby said rotating drill head assembly can be rotated in a plane perpendicular to the main drive shaft to utilize either accessory without the need of rechucking it.

6. A rotating dual attachment apparatus tool, as defined in claim 5, wherein said device has two (2) different gear ratios, one high speed/low torque and one low speed/high torque.

7. A rotating dual attachment apparatus tool, as defined in claim 6, wherein said device has a safety door covering part of said safety guard housing cavity.

8. A rotating dual attachment apparatus tool, as defined in claim 7, wherein said device's electric motor speed and direction of rotation is controllable by a speed adjuster located on said stem grip housing.

9. A Rotating Dual Attachment Receptacle Apparatus Tool comprising:

a stem grip housing having a top and bottom end, said stem grip housing having an electric motor disposed therein;

a safety guard housing, said safety guard housing being disposed generally normal to the longitudinal axis of said stem grip housing and suitably affixed thereto; said safety guard housing having disposed therein a cavity;

a rotating drill head assembly having a top and bottom end, said rotating drill head assembly being generally disposed within said safety guard housing cavity having a main drive shaft and a plurality of chuck shafts therein, the main drive shaft having an upper and lower end, wherein the lower end extends into said stem grip housing and the upper end extends into said safety guard housing; said rotating drill head assembly being able to rotate about the main drive shaft axis;

means for opening and closing the power source, said opening and closing means comprises a plurality of electric contacts suitably located at the lower front portion of said safety guard housing and the bottom end of said rotating drill head assembly, wherein the electric contacts close the electrical circuit when said rotating drill head assembly is positioned in either of the 180 degree locking interval positions;

whereby said rotating drill head assembly can be rotated in a plane perpendicular to the main drive shaft to utilize either accessory without the need of rechucking it.

10. A rotating dual attachment apparatus tool, as defined in claim 9, wherein said device has means for locking said rotating drill head assembly, the locking means disposed within said rotating drill head assembly and into a locking depression located within the top inside surface of said safety guard housing.

11. A rotating dual attachment apparatus tool, as defined in claim 10, wherein said device locking means has a sliding post portion which locks said rotating drill head assembly at 180 degree interval locking positions.

12. A rotating dual attachment apparatus tool, as defined in claim 11, wherein said stem grip housing has a power source disposed therein.

13. A rotating dual attachment apparatus tool, as defined in claim 12, wherein the power source is a d.c. battery.

14. A Rotating Dual Attachment Receptacle Apparatus Tool comprising:

a stem grip housing having a top and bottom end, said stem grip housing having an electric motor disposed therein;

a safety guard housing, said safety guard housing being disposed generally normal to the longitudinal axis of said stem grip housing and suitably affixed thereto; said safety guard housing having disposed therein a cavity and a plurality of locking depressions;

a rotating drill head assembly having a top and bottom end, said rotating drill head assembly being generally disposed within said safety guard housing cavity having a main drive shaft and a plurality of chuck shafts therein, the main drive shaft having an upper and lower end, wherein the lower end extends into said stem grip housing and the upper end extends into said safety guard housing; said rotating drill head assembly being able to rotate about the main drive shaft axis;

means for locking said rotating drill head assembly, said locking means being disposed within said rotating drill head assembly which extends into the locking depressions located within the top inside surface of said safety guard housing;

means for opening and closing the motor's electric circuit, said opening and closing means comprises a plurality of electric contacts suitably located at the lower front of said safety guard housing and the bottom end said rotating drill head assembly, wherein the electric contacts close the electrical circuit when said rotating drill head assembly is positioned in either of the 180 degree locking interval positions;

whereby said rotating drill head assembly may be operated in any of the locking positions when either chuck is being used and can be rotated in a plane perpendicular to the main drive shaft to utilize either accessory without the need of rechucking it.

15. A rotating dual attachment receptacle apparatus tool, as defined in claim 14, wherein said stem grip housing has a power source disposed therein.

16. A rotating dual attachment receptacle apparatus tool, as defined in claim 15, wherein the power source is a d.c. battery.

17. A rotating dual attachment receptacle apparatus tool, as defined in claim 16, wherein said locking means has a sliding post portion which extends into the locking depressions and securely locks said rotating drill head assembly at 180 degree interval locking positions.

18. A Rotating Dual Attachment Receptacle Apparatus Tool comprising:

a stem grip housing having a top and bottom end, said stem grip housing having an electric motor disposed therein;

a safety guard housing, said safety guard housing being disposed generally normal to the longitudinal axis of said stem grip housing and suitably affixed thereto; said safety guard housing having disposed therein a cavity and a plurality of locking depressions;

a rotating drill head assembly having a top and bottom end, said rotating drill head assembly being generally disposed within said safety guard housing cavity having a main drive shaft and a plurality of chuck shafts therein, the main drive shaft having an upper and lower end, wherein the lower end extends into said stem grip housing and the upper end extends into said safety guard housing; said rotating drill head assembly being able to rotate about the main drive shaft axis;

means for locking said rotating drill head assembly, said locking means being disposed within said rotating drill head assembly which extends into the locking depressions located within the inside surface of said safety guard housing;

means for opening and closing the motor's electric circuit, said opening and closing means comprises a plurality of electric contacts suitably located at the lower front portion of said safety guard housing and the bottom end of said rotating drill head assembly, wherein the electric contacts close the electrical circuit when said rotating drill head assembly is positioned in either of the 180 degree locking interval positions;

whereby said rotating drill head assembly may be operated in any of the locking positions when either chuck is being used and can be rotated in a plane perpendicular to the main drive shaft to utilize either accessory without the need of rechucking it.

19. A rotating dual attachment receptacle apparatus tool, as defined in claim 18, wherein said stem grip housing has a power source disposed therein.

20. A rotating dual attachment receptacle apparatus tool, as defined in claim 19, wherein the power source is a d.c. battery.

21. A rotating dual attachment receptacle apparatus tool, as defined in claim 20, wherein said locking means has a sliding post portion which extends into the locking depressions and securely locks said rotating drill head assembly at 180 degree interval locking positions.

22. A rotating dual attachment receptacle apparatus tool, as defined in claim 21, wherein said device has two (2) different gear ratios one high speed/low torque and one low speed/high torque.

23. A rotating dual attachment apparatus tool, as defined in claim 22, wherein said device has a safety door covering part of the safety guard housing cavity.

24. A rotating dual attachment apparatus tool, as defined in claim 23, wherein said device electric motor speed and direction of rotation is controllable by a speed adjuster located on said stem grip housing.

25. A Rotating Dual Attachment Receptacle Apparatus Tool comprising:

a stem grip housing having a top and bottom end, said stem grip housing having an electric motor and power source disposed therein;

a safety guard housing, said safety guard housing being disposed generally normal to the longitudinal axis of said stem grip housing and suitably affixed thereto; said safety guard housing having disposed therein a cavity;

a rotating drill head assembly having a top and bottom end, said rotating drill head assembly being generally disposed within said safety guard housing cavity having a main drive shaft and a plurality of chuck shafts therein, the main drive shaft having an upper and lower end, wherein the lower end extends into said stem grip housing and the upper end extends into said safety guard housing; said rotating drill head assembly being able to rotate about the main drive shaft axis;

a locking means disposed within said rotating drill head assembly which extends into locking depressions located within the top inside surface of said safety guard housing, the locking means having a sliding post portion which extends into the locking depressions and securely locks said rotating drill head assembly at 180 degree interval locking positions;

means for opening and closing the power source, the opening and closing means comprises a plurality of electric contacts suitably located at the lower front portion of said safety guard housing and the bottom end of said rotating drill head assembly, wherein the electric contacts close the electrical circuit when said rotating drill head assembly is positioned in either of the 180 degree locking interval positions;

whereby said rotating drill head assembly can be rotated in a plane perpendicular to the main drive shaft to utilize either accessory without the need of rechucking it.

26. A rotating dual attachment apparatus tool, as defined in claim 25, wherein said device has two (2) different gear ratios, one high speed/low torque and one low speed/high torque.

27. A rotating dual attachment apparatus tool, as defined in claim 26, wherein said device has a safety door covering part of the safety guard housing cavity.

28. A rotating dual attachment apparatus tool, as defined in claim 27, wherein said device electric motor speed and direction of rotation is controllable by a speed adjuster located on said stem grip housing.

29. A rotating dual attachment apparatus tool, as defined in claim 28, wherein the power source is a d.c. battery.

30. A rotating dual attachment apparatus tool comprising:

a stem grip housing having a top and bottom end, said stem grip housing having an electric motor and power source disposed therein;

a safety guard housing, said safety guard housing being disposed generally normal to the longitudinal axis of said stem grip housing and suitably affixed thereto; said safety guard housing having disposed therein a cavity;

a rotating drill head assembly having a top and bottom end, said rotating drill head assembly being generally disposed within said safety guard housing cavity having a main drive shaft and a plurality of chuck shafts therein, the main drive shaft having an upper and lower end, wherein the lower end extends into said stem grip housing and the upper end extends into said safety guard housing; said rotating drill head assembly being able to rotate about the main drive shaft axis;

means for locking said rotating drill head assembly;

means for opening and closing the power source, the opening and closing means comprises a plurality of electric contacts suitably located at the lower front portion of said safety guard housing and the bottom end of said rotating drill head assembly, wherein the electric contacts close the electrical circuit when said rotating drill head assembly is positioned in either of the 180 degree locking interval positions;

whereby said rotating drill head assembly can be rotated in a plane perpendicular to the main drive shaft to utilize either accessory without the need of rechucking it.

31. A rotating dual attachment apparatus tool, as defined in claim 30, wherein said device has two (2) different gear ratios, one high speed/low torque and one low speed/high torque.

32. A rotating dual attachment apparatus tool, as defined in claim 31, wherein said device has a safety door covering part of the safety guard housing cavity.

33. A rotating dual attachment apparatus tool, as defined in claim 32, wherein said device's electric motor speed and direction of rotation is controllable by a speed adjuster located on said stem grip housing.

34. A rotating dual attachment apparatus tool, as defined in claim 33, wherein the power source is a d.c. battery.

35. A Rotating Dual Attachment Receptacle Apparatus Tool comprising:

a stem grip housing having a top and bottom end, said stem grip housing having an electric motor and power source disposed therein;

a safety guard housing, said safety guard housing being disposed generally normal to the longitudinal axis of said stem grip housing and suitably affixed thereto; said safety guard housing having disposed therein a cavity;

a rotating drill head assembly having a top and bottom end, said rotating drill head assembly being generally disposed within said safety guard housing cavity having a main drive shaft and a plurality of chuck shafts therein, the main drive shaft having an upper and lower end, wherein the lower end extends into said stem grip housing and the upper end extends into said safety guard housing; said rotating drill head assembly being able to rotate about the main drive shaft axis;

means for opening and closing the power source, said opening and closing means comprises a plurality of electric contacts suitably located at the lower front portion of said safety guard housing and the bottom end of said rotating drill head assembly, wherein the electric contacts close the electrical circuit when said rotating drill head assembly is positioned in either of the 180 degree locking interval positions;

whereby said rotating drill head assembly can be rotated in a plane perpendicular to the main drive shaft to utilize either accessory without the need of rechucking it.

36. A rotating dual attachment apparatus tool, as defined in claim 35, wherein the power source is a d.c. battery.

37. A Rotating Dual Attachment Receptacle Apparatus Tool comprising:

a stem grip housing having a top and bottom end, said stem grip housing having an electric motor and power source disposed therein;

a safety guard housing, said safety guard housing being disposed generally normal to the longitudinal axis of said stem grip housing and suitably affixed thereto; said safety guard housing having disposed therein a cavity and a plurality of locking depressions;

a rotating drill head assembly having a top and bottom end, said rotating drill head assembly being generally disposed within said safety guard housing cavity having a main drive shaft and a plurality of chuck shafts therein, the main drive shaft having an upper and lower end, wherein the lower end extends into said stem grip housing and the upper end extends into said safety guard housing, the chuck shafts extends through the front and back ends of said rotating drill head assembly with the longitudinal axis of the chuck shafts being normal to the longitudinal axis of the main drive shaft with a chuck attached to each end thereof; said rotating drill head assembly being able to rotate in a 360 degree plane about the main drive shaft axis;

means for locking said rotating drill head assembly, said locking means being disposed within said rotating drill head assembly and extends into the locking depressions located within said safety guard housing; said locking means having a sliding post portion which extends into the locking depressions and securely locks said rotating drill head assembly at 180 degree interval locking positions;

means for opening and closing the power source, said opening and closing means comprises a plurality of electric contacts suitably located at the lower front portion of said safety guard housing and the bottom end of said rotating drill head assembly, wherein the electric contacts close the electrical circuit when said rotating drill head assembly is positioned in either of the 180 degree locking interval positions;

whereby said rotating drill head assembly may be operated in any of the locking positions when either chuck is being used and can be rotated in a plane perpendicular to the main drive shaft to utilize either accessory without the need of rechucking it.

38. A rotating dual attachment apparatus tool, as defined in claim 37, wherein the power source is a d.c. battery.

* * * * *